US012036186B2

(12) United States Patent
Noesi

(10) Patent No.: US 12,036,186 B2
(45) Date of Patent: Jul. 16, 2024

(54) ADJUSTABLE BABY SELF FEEDING PILLOW

(71) Applicant: Rosanna Noesi, Wayne, NJ (US)

(72) Inventor: Rosanna Noesi, Wayne, NJ (US)

( * ) Notice: Subject to any disclaimer, the term of this patent is extended or adjusted under 35 U.S.C. 154(b) by 0 days.

(21) Appl. No.: 18/073,809

(22) Filed: Dec. 2, 2022

(65) Prior Publication Data

US 2024/0180786 A1 Jun. 6, 2024

(51) Int. Cl.
*A41B 13/00* (2006.01)
*A47D 13/08* (2006.01)
*A61J 9/06* (2006.01)

(52) U.S. Cl.
CPC .......... *A61J 9/0669* (2015.05); *A47D 13/083* (2013.01); *A61J 9/0638* (2015.05)

(58) Field of Classification Search
CPC ...... A61J 9/0669; A61J 9/0638; A47D 13/083
See application file for complete search history.

(56) References Cited

U.S. PATENT DOCUMENTS 4,245,688 A * 1/1981 Vecchiarelli ............ E06B 9/324 160/178.2
4,271,893 A * 6/1981 McCluskey ............... E06B 9/32 242/378
4,352,386 A * 10/1982 Butler ..................... E06B 9/324 24/136 A
4,895,327 A * 1/1990 Malone ................. A61J 9/0638 248/102
D325,460 S * 4/1992 Cameron ....................... D2/864
5,312,282 A * 5/1994 Cooper ..................... A61J 9/00 215/11.1
5,472,036 A * 12/1995 Judkins ................... E06B 9/324 24/134 R
5,624,090 A * 4/1997 Gammelgaard .......... A61J 9/08 248/102
5,979,843 A * 11/1999 Beck ..................... A61J 9/0669 248/105
D429,588 S * 8/2000 Smederod ............... E06B 9/324 D6/575
D444,934 S * 7/2001 Ross .............................. D2/860
6,739,933 B2 * 5/2004 Taylor ....................... A45F 5/00 446/28
6,745,399 B1 * 6/2004 Austin ................ A41B 13/103 248/102
6,752,195 B1 * 6/2004 Chou ...................... E06B 9/324 160/178.1 R
6,823,926 B1 * 11/2004 Tyner ...................... E06B 9/324 160/178.2
6,961,961 B1 * 11/2005 Ezra ....................... A41B 13/10 2/49.1

(Continued)

*Primary Examiner* — Amy J. Sterling
(74) *Attorney, Agent, or Firm* — The Rapacke Law Group, P.A.; Andrew S. Rapacke

(57) ABSTRACT

In some embodiments, an apparatus for supporting a feeding device for an infant is provided. In some examples, an apparatus comprising a body and feeding device support structure is provided. A body and feeding device support structure may comprise one or more pieces of fabric, the one or more pieces of fabric are attached by one or more seams. The feeding device support structure may comprise a U-shaped support structure and an elastic band for positioning a feeding device. In some embodiments, an apparatus may comprise an animal design and/or shape.

20 Claims, 12 Drawing Sheets

(56) References Cited

U.S. PATENT DOCUMENTS

| | | | | |
|---|---|---|---|---|
| 7,032,248 | B1 * | 4/2006 | Gutilla | A41B 13/10 2/49.1 |
| 7,316,035 | B2 * | 1/2008 | Archambault | A41D 13/04 2/48 |
| 7,690,415 | B2 * | 4/2010 | Cheng | E06B 9/322 160/170 |
| 7,883,391 | B1 * | 2/2011 | Asomani | A61J 9/0669 446/28 |
| 8,161,571 | B1 * | 4/2012 | Beaupain | A41B 13/10 2/46 |
| 10,695,268 | B2 * | 6/2020 | Holk | A61J 9/0669 |
| 11,484,126 | B1 * | 11/2022 | Vest | B60N 2/882 |
| 2003/0173037 | A1 * | 9/2003 | Liu | E06B 9/324 160/178.2 |
| 2004/0140407 | A1 * | 7/2004 | Morris | A61J 9/0661 248/205.2 |
| 2005/0066405 | A1 * | 3/2005 | Babiak | A41D 13/04 2/48 |
| 2006/0108077 | A1 * | 5/2006 | Wang | E06B 9/262 160/178.2 |
| 2008/0093513 | A1 * | 4/2008 | Kunzelman | A61J 9/0638 248/102 |
| 2020/0397664 | A1 * | 12/2020 | Hafizi | A61J 9/0638 |
| 2021/0315393 | A1 * | 10/2021 | Meadows | A47D 15/00 |

* cited by examiner

ADJUSTABLE BABY SELF FEEDING PILLOW

TECHNICAL FIELD

The embodiments generally relate to baby feeding. More particularly, some embodiments herein relate to infant neck support, infant feeding devices, apparatuses, and/or methods and methods of use thereof.

BACKGROUND

Infants and young children often require bottle feeding and nearly constant care and attention from a parent or caregiver. In part, a caregiver often finds her/himself spending large amounts of time and energy holding a feeding bottle for an infant in a preferred and comfortable position for the infant.

What is needed is a comfortable solution for positioning a bottle for a feeding infant without requiring as much parent or caregiver attention, time, and/or energy.

SUMMARY OF THE INVENTION

This summary is provided to introduce a variety of concepts in a simplified form that is further disclosed in the detailed description of the embodiments. This summary is not intended to identify key or essential inventive concepts of the claimed subject matter, nor is it intended for determining the scope of the claimed subject matter.

The embodiments provided herein generally relate to infant and/or child feeding. More particularly, some embodiments herein relate to infant neck support, infant feeding devices, apparatuses, and/or methods and methods of use thereof.

In some embodiments, an apparatus for supporting a feeding device for an infant is provided. Feeding device support may be provided by a protrusion or feeding device support structure.

In some embodiments, an adjustable neck-supporting baby bottle positioner and/or holder is provided. Neck support may be provided by a cushioning or pillow portion of the apparatus. In some examples, a wrap cushioning around an infant's neck area may prevent or limit neck strain.

In some examples, an apparatus comprising a body and feeding device support structure is provided. A body and feeding device support structure may comprise one or more pieces of fabric, wherein one or more pieces of fabric are attached by one or more seams. The feeding device support structure may comprise a U-shaped support structure and an elastic band for positioning a feeding device. In some embodiments, an apparatus may comprise an animal design and/or shape.

Embodiments herein assist and/or allow for enabling infants to hold their own feeding devices such as bottles and/or sip cups. By doing so, embodiments herein assist infants to largely feed themselves, requiring much less help and/or attention from their caregivers throughout the feeding process.

BRIEF DESCRIPTION OF THE DRAWINGS

A complete understanding of the present embodiments and the advantages and features thereof will be more readily understood by reference to the following detailed description when considered in conjunction with the accompanying drawings wherein.

DETAILED DESCRIPTION

Figure 1A:
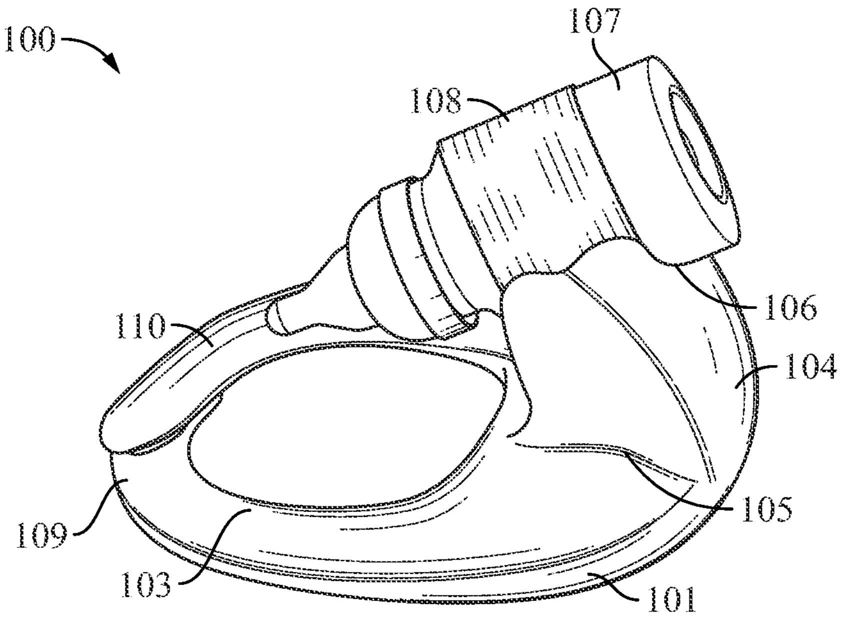
FIG. 1A is a first perspective view of a first exemplary embodiment of neck-supporting feeding apparatus.

The specific details of the single embodiment or variety of embodiments described herein are the described systems, apparatuses, and methods of use. Any specific details of the embodiments are used for demonstration purposes only, and no unnecessary limitations or inferences are to be understood thereon.

Before describing in detail exemplary embodiments, it is noted that the embodiments reside primarily in combinations of components and procedures related to the system. Accordingly, the system components have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein.

In general, the embodiments provided herein relate to baby feeding. More particularly, some embodiments herein relate to a neck-supporting, baby feeding apparatus.

In some embodiments, an adjustable, neck-supporting baby bottle positioner and/or holder apparatus is provided.

In some embodiments, an apparatus may be a pillow or pillow-like apparatus.

In some embodiments, an apparatus may be a cushion or cushion-like apparatus.

For example, an apparatus may be comprised of one or more pieces of fabric and/or textile. Fabric and/or textiles may be stitched together and/or joined by various types of seams, allowing for the creation of an enclosure that may be filled and/or stuffed with a filling and/or stuffing material.

In some examples, a filler and/or stuffing material may comprise down, feathers, polyester fiberfill, buckwheat hull, kapok, cotton, wool, latex, microbeads, foam, foam rubber, memory foam, or other soft materials.

In some embodiments, an apparatus may be a neck pillow. A neck pillow may comprise a pillow shaped like a horseshoe and or U-shape and/or otherwise allows for multi-point support for the head when in use. A neck pillow may relieve pressure and/or strain on the neck, neck muscles, and/or cervical area of the spine. In some examples, a neck pillow is referred to as a cervical pillow.

In some embodiments, an apparatus may be a neck pillow in a J-shape, or substantially J-shape, when viewed from either side when positioned on an infant. For example, a neck pillow may wrap around and/or behind the neck of an infant, pass or hook over the shoulders to the chest area, and hook forward to form a J-shape.

In some embodiments, an apparatus may be a neck pillow in a U-shape, or substantially U-shape, when viewed from the front when positioned on an infant. For example, a neck pillow may form a U-shape from one shoulder of an infant, across his/her chest, and to his/her other shoulder.

In some embodiments, an apparatus may be a neck pillow in an open ring shape, or substantially open ring shape, when viewed from the front or above when positioned on an infant. For example, a neck pillow may form an open ring shape from one shoulder of an infant, across his/her chest, and to his/her other shoulder.

In some embodiments, an apparatus may be a neck pillow in an open ovular shape, or substantially open ovular shape, when viewed from the front or above when positioned on an infant. For example, a neck pillow may form an open ovular shape from one shoulder of an infant, across his/her chest, and to his/her other shoulder.

In some embodiments, an apparatus may be a neck pillow that is symmetrical, or substantially symmetrical, when viewed from the front when positioned on an infant.

In some embodiments, an apparatus may be a neck pillow with a protrusion suitable for supporting a feeding device. In some embodiments, an apparatus may be a neck pillow with a feeding device support structure suitable for supporting a feeding device.

In some embodiments, a feeding device may be a cylindrical feeding device, such as a feeding bottle and/or sip cup.

In some embodiments, an apparatus may be a neck pillow with a U-shaped, or substantially U-shaped, protrusion suitable for supporting a feeding device. U-shaped protrusion may be suitable for seating and/or supporting a cylindrical feeding device.

In some embodiments, an apparatus may be rigid, or substantially rigid.

In some embodiments, an apparatus may be firm, or substantially firm.

In some embodiments, an apparatus may be flexible, or substantially flexible.

Multi-Part Construction

In some embodiments, an apparatus may be comprised of one or more pieces of fabric and/or textile assembled to create a pillow, cushion, and/or pillow-like structure.

In some example embodiments, an apparatus may be comprised of four or more pieces of fabric assembled to create a pillow or pillow-like structure. For example, a first piece of fabric may be attached or joined to a second piece of fabric via one or more seams to produce a body portion of an apparatus. For example, a third piece of fabric may be attached to a fourth piece of fabric via one or more seams to produce a protrusion or feeding device support portion of an apparatus. In some examples, the protrusion or feeding device support portion of the apparatus may be attached or joined to the body portion of the apparatus via one or more seams.

For example, the first piece of fabric may be cut and/or manufactured in a particular shape, such as in a horseshoe or U-shape to serve as an underside of a pillow or cushion apparatus.

The second piece of fabric may be cut and/or manufactured in a particular shape, such as in a horseshoe or U-shape substantially similar to the first piece of fabric, to serve as an upper side of a pillow or cushion apparatus. A cut or shape of the second piece of fabric may differ from the first piece of fabric to allow the joining of a protrusion and/or front-feeding device support structure.

The third piece of fabric may be cut and/or manufactured in a particular shape, such as in a horseshoe or U-shape to serve as the underside of protrusion and/or feeding device support structure.

The fourth piece of fabric may be cut and/or manufactured in a particular shape, such as in a horseshoe or U-shape to serve as the upper side of the protrusion and/or feeding device support structure.

The first piece of fabric may be joined and/or attached to the second piece of fabric by a first seam to form a fillable enclosure of a body of an apparatus according to embodiments herein.

The third piece of fabric may be joined and/or attached to the fourth piece of fabric by a second seam to form a fillable enclosure of a protrusion or feeding device support structure of an apparatus according to embodiments herein.

The protrusion or feeding device support structure may be joined and/or attached to the body by a third seam to form a contiguous fillable structure of an apparatus according to embodiments herein.

In some embodiments, alternatively, protrusion or feeding device support structure may be joined and/or attached to the body by a third seam to form an incontiguous fillable structure of an apparatus according to embodiments herein. For example, the body and support structure may be separated by a separation layer of fabric. This may, for example, allow for stuffing the body and feeding device support structures with different materials to accomplish different rigidities.

In some embodiments, a fastener may be attached to end portions of protrusion or feeding device support structure. The fastener may be comprised of an elastic band, for example. The fastener may serve to position and hold a feeding device in place. For example, a feeding device may be positioned such that a nipple of the sipping area is positioned near an infant's mouth when in use.

In some embodiments, the fastener may be attached by additional seams on each end of a U-shape feeding device support structure. In some examples, an elastic band may fasten a cylindrical baby bottle or sip cup in the support structure.

Adjustable Neck Attachment

In some embodiments, a portion of an apparatus may serve as a neck attachment area. In some examples, this may allow an apparatus to act as a wearable for an infant.

In some embodiments, the attachment area may comprise two ends of an open ring shape neck pillow or cushion. In some embodiments, the attachment area may comprise two ends of a U-shaped neck pillow or cushion. Each end may be designed to be suitable for overlapping.

In some examples, one end may comprise a lesser amount of, or no, stuffing and/or filler. This construction may create a thinner and/or tapered portion suitable to be overlapped by the corresponding opposite end member.

In some embodiments, an under portion of an overlapping end member may comprise an attachment means for attaching to a corresponding receiving area of attachment means on the top portion of the opposite end member.

In some examples, attachment means may comprise a Velcro section and/or area. Velcro area may be used to adjustably fasten the ends of a U-shaped neck pillow around an infant's neck for example, In other examples, attachment means may comprise a set of buttons such as snap buttons.

Attachment means may allow for adjustably fastening, fixing, connecting, and/or attaching opposite ends of a U-shaped neck pillow. For example, a first set of snap buttons may allow for a looser fit and a second set of snap buttons may allow for a tighter fit.

U-Shaped Protrusion and/or Feeding Device Seating/Support Structure

In some embodiments, apparatuses herein comprise a protrusion and/or feeding device support structure suitable for seating/supporting a feeding device.

In some embodiments, a protrusion and/or feeding device seating/support structure may be in a U-shape. Protrusion and/or feeding device seating/support structure may be suitable for encircling, supporting, and or seating a feeding device such as a cylindrical baby bottle and/or sip cup.

In some examples, a protrusion and/or feeding device seating/support structure may be suitable for encircling, supporting, and/or seating at least ⅛ of a cylindrical feeding device.

In some examples, a protrusion and/or feeding device seating/support structure may be suitable for encircling, supporting, and/or seating at least 1/7 of a cylindrical feeding device.

In some examples, a protrusion and/or feeding device seating/support structure may be suitable for encircling, supporting, and/or seating at least ⅙ of a cylindrical feeding device.

In some examples, a protrusion and/or feeding device seating/support structure may be suitable for encircling, supporting, and/or seating at least ⅕ of a cylindrical feeding device.

In some examples, a protrusion and/or feeding device seating/support structure may be suitable for encircling, supporting, and/or seating at least ¼ of a cylindrical feeding device.

In some examples, a protrusion and/or feeding device seating/support structure may be suitable for encircling, supporting, and/or seating at least ⅓ of a cylindrical feeding device.

In some examples, a protrusion and/or feeding device seating/support structure may be suitable for encircling, supporting, and/or seating at least ½ of a cylindrical feeding device.

In some examples, protrusion and/or feeding device seating/support structure may be suitable for encircling, supporting, and/or seating at least ¾ of a cylindrical feeding device.

Elastic Band

In some example embodiments, a protrusion or feeding device support portion of the apparatus may comprise a fastener such as an elastic band portion attached or joined to the protrusion or feeding device support portion by additional seams. The elastic band may allow for firm positioning and/or holding a feeding device such as a baby bottle and/or sip cup.

In some examples, the elastic band allows for advantageous insertion and/or positioning of the feeding device.

A feeding device fastener may be appropriately sized in length to position and hold a feeding device such as a baby bottle or sip cup. For example, a baby bottle may measure 6 inches or longer and 2-3 inches in diameter. A fastener may be sized accordingly to be between 2-4 inches to wrap and hold in position a substantial portion of a baby's bottle.

Infant's Grasp

As can be seen in the Drawings herein, an infant's hands and/or grasp may be too small to reliably hold or handle a feeding device such as a baby bottle or sip cup. Even more problematically, most infants do not yet possess the motor skills to consistently maintain and/or manage their own feeding device. In some examples, babies often drop their bottles soon after gaining control of them.

In some examples, embodiments herein allow infants and/or caregivers to overcome these problems. A feeding device may be substantially maintained and/or held in a manageable position for an infant. Further, a weight of a bottle may be fully or substantially managed and/or handled by some apparatus embodiments described herein.

In some examples, as seen in the Drawings herein, an infant need not be capable to grasp and/or hold a bottle in position. However, embodiments herein allow for infants to exercise mild control to pull the bottle towards his/her face during feeding by, for example grasping the back of a pillow apparatus protrusion. In this example, the infant's action is simply a less skillful act of pulling rather than skillful control of grasping and/or holding a bottle of a weight that is possibly too much for the infant to handle.

Apparatus Shape

In some embodiments, the apparatus may form a curved shape, an S-shape, and/or a J-shape.

In some examples, a body and feeding device support structure may be J-shaped, or substantially J-shaped.

A J-shape pillow or cushion structure, advantageously, may allow for rebounding or recoiling behavior. That is, for example, an infant may be able to pull the bottom of a J-shape structure towards his/her face as needed to reach the nipple of a positioned bottle and/or sip cup. After the release of force, the J-shape structure may recoil and/or rebound back to a position wherein the nipple of a positioned bottle and/or sip cup is just outside of, or away, from his/her mouth.

Thus, a J-shape apparatus may mimic a parent and/or caregiver's action of positioning a nipple of a bottle and/or sip cup just outside of an infant's mouth until the infant desires to feed again.

Such behavior and/or capability allow for an infant to self-regulate his/her feeding frequency with less parent/caregiver attention.

Infant Neck Support

In another aspect of some embodiments, a neck supporting design and/or structure is provided.

Support of an infant's head is a very important safety consideration. An infant's neck muscles are often not fully developed enough to support the head for longer periods. Therefore, it would be beneficial to aid an infant's neck to support the head during the feeding process, and the like.

In some embodiments, an apparatus further provides cushioning around an infant's neck and prevents undue strain.

For example, a cushioning neck wrapping portion prevents an infant's head from bending too far. In another example, a cushioning neck wrapping portion assists an infant's neck muscles to support the head. In another example, a cushioning neck wrapping portion may prevent an infant from losing some or all circulation to the head.

Animal Shape and/or Design

In some embodiments, a shape or design that may grab an infant's attention, entertain an infant, and/or increase an infant's fondness is provided.

In some examples, an apparatus may mimic the shape of an animal.

For example, the ends of a neck wrapping portion of a pillow or cushion may be designed to mimic the arms of a monkey, tiger, elephant, dinosaur, or the like.

Further, for example, a top portion of an apparatus, such as an elastic band fastener for an infant's feeding device may comprise one or more parts that mimic the head of an animal. For example, an elastic band may comprise animal ears, eyes, or fins.

In some embodiments, one or more of the aforementioned animal parts may be combined to provide an apparatus that creates an experience for an infant while in use, wherein the infant feels he/she is interacting with an animal and/or being hugged by an animal.

Fabric/Textile Types

Various types of fabrics and/or textiles and combinations may be used with the embodiments herein.

In some examples, fabrics and/or textile types that may be used with embodiments herein may include cotton, cotton jersey knit, bamboo rayon, minky, and/or gauze.

It will be understood that various combinations and/or compositions of fabric and/or textiles may be used.

Seam Types

Various types of seams and combinations may be used with the embodiments herein.

In some examples, seam types that may be used with embodiments herein may include plain, lapped, bound, and/or flat seams.

It will be understood that various combinations of seam types may be used.

Filler/Stuffing Types

Various types of filler and/or stuffing and combinations may be used with the embodiments herein.

In some examples, seam types that may be used with embodiments herein may include down, feathers, polyester fiberfill, buckwheat hull, kapok, cotton, wool, latex, microbeads, foam rubber, memory foam, or other soft materials.

It will be understood that various combinations of filler and/or stuffing types may be used.

Patterns/Designs/Colors

Various patterns, styles, designs, and/or colors, may be used with the embodiments herein.

It will be understood that any combination of patterns, styles, designs, and/or colors may be used.

Further example embodiments are described herein with reference to the Figures.

FIG. 1A is a first perspective view 100 of a first exemplary embodiment of a neck-supporting feeding apparatus 101 and placement on an infant 102 while in use.

In this example, feeding apparatus 101 may be comprised of body 103 and a feeding device support structure 104. Body 103 and/or feeding device support structure 104 may comprise one or more cushions. Body 103 and/or feeding device support structure 104 may be joined and/or attached by a first seam 105.

Feeding device support structure 104 may comprise a U-shaped seating and/or receiving area 106 for seating and/or receiving a feeding device 107 such as a baby bottle and/or sip cup.

Feeding device support structure 104 may further comprise an elastic band 108.

Body 103 may comprise a cushion forming a flexible U-shape, flexible horseshoe shape, or flexible open ring shape. The flexibility of body 103 allows for adjustably and temporarily joining ends of an open ring shape to form a closed ring encircling an infant's neck and/or to cradle an infant's head, for example.

In some examples, the first end of the open ring shape body 103 may be used as an overlapping end 109 and the second end of the open ring shape body 103 may be used as an underlapping end 110.

The overlapping end 109 and underlapping end 110 may comprise complementary parts of an attachment mechanism and/or means.

In some examples, a first attachment complement on an overlapping end 109 may comprise a male or female button of a set of snap buttons. A second attachment complement on an underlapping end 110 may comprise the complementary male or female button of the set of snap buttons. Multiple snap buttons may be arranged and attached on overlapping end 109 and underlapping end 110 allowing for adjustability. By using this adjustability, the distance of a feeding device seated in the feeding device support structure 104 from an infant's mouth may be adjusted.

Figure 1B:
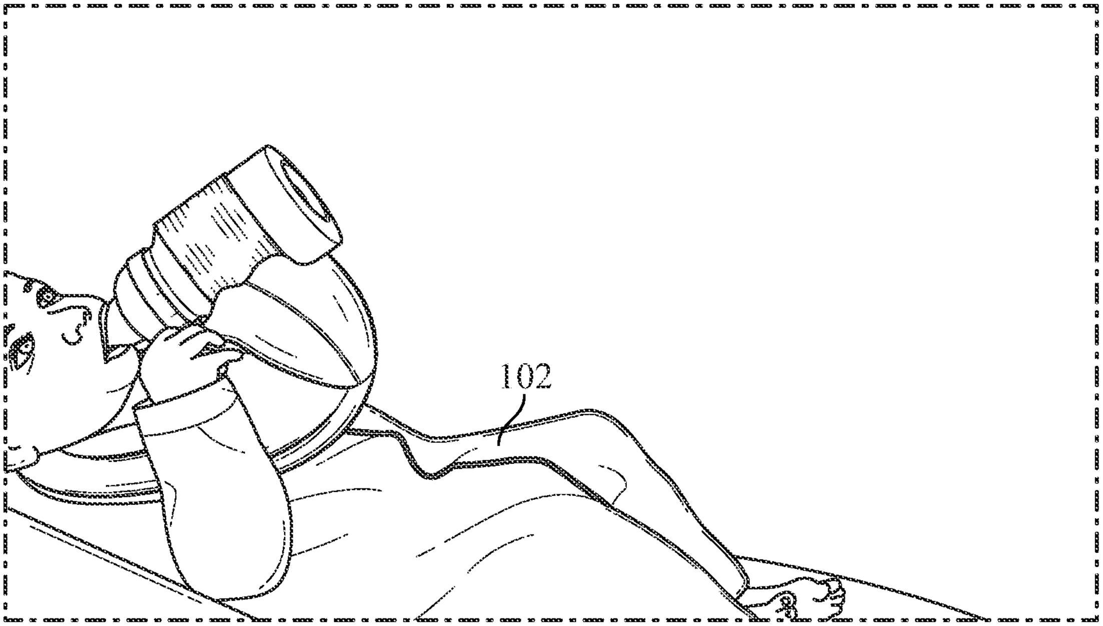
FIG. 1B shows an example of the first exemplary embodiment of neck-supporting feeding apparatus while in use.

FIG. 1B shows an example of the first exemplary embodiment of neck-supporting feeding apparatus while in use.

Figure 2:
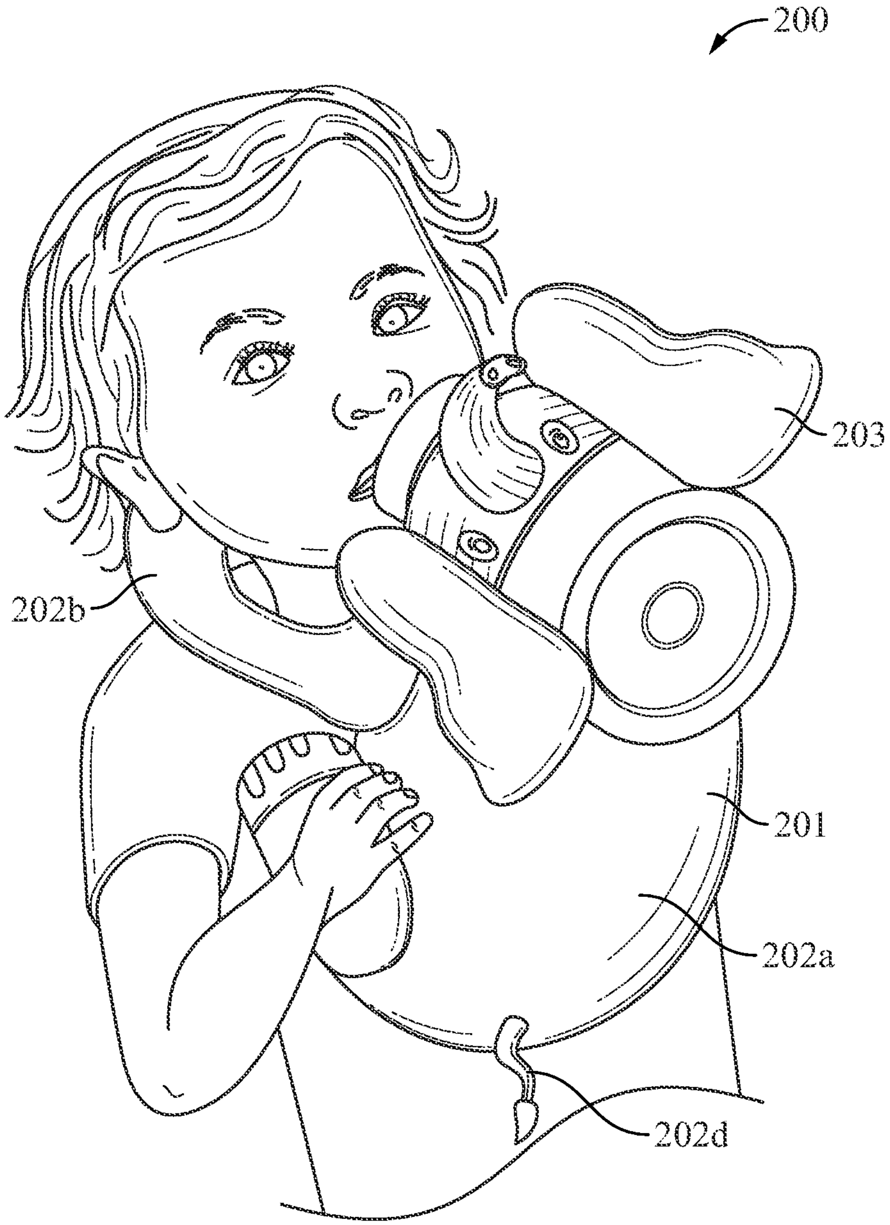
FIG. 2 is a second perspective view of a second exemplary embodiment of neck supporting feeding apparatus while in use.

FIG. 2 is a second perspective view 200 of a second exemplary embodiment of a neck supporting feeding apparatus 201 while in use.

In this example, feeding apparatus 201 may be comprised of body 202*a* and a feeding device support structure 203. Feeding device support structure 203 may also be referred to as a seating, seating structure, and/or base.

Body 202*a* and/or feeding device support structure 203 may each comprise or form one or more cushions.

It will be understood that body 202*a* can take various forms and feeding device support structure 203 can take various forms.

In this example, a feeding apparatus is shown wherein the apparatus comprises several animal features to create a resemblance of an animal and/or animal doll. The resemblance of an animal and/or doll may facilitate an infant's amicability, entertainment, and/or engagement with the apparatus 201, for example. In some examples, the ability of apparatus 201 to entertain an infant while also assisting/enabling the infant in using a feeding device permits a caregiver to focus on other activities.

Body 202*a* and/or feeding device support structure 203 may comprise parts resembling parts of an animal. For example, body 202*a* and/or feeding device support structure 203 may comprise parts resembling a body of an elephant and a head of an elephant, respectively.

Overlapping and underlapping ends of an open ring shape body 202*a* of feeding apparatus 201 comprises a design, shape, and/or pattern to resemble the "arms" (i.e., front legs) of an elephant.

As described herein, a first end 202*b* and a second end 202*c* of open ring body 202*a* may be allowed to adjustably connect to encircle the neck of an infant, for example. The connection between the first end 202*b* and the second end 202*c* may create an impression that the infant is being "hugged" by an elephant doll.

The adjustability of the connection of the first end 202*b* and the second end 202*c* allows for adjustment of the circumference and diameter of the ring formed when the first end 202*b* and the second end 202*c* are connected. Adjustment of the circumference and diameter of the ring formed when the first end 202*b* and the second end 202*c* are connected may have an effect of changing the distance of a feeding device seated and/or positioned in feeding device support structure 203 and the infant's face/mouth.

In this example, body 202*a* may comprise additional elements to contribute to a resemblance of an animal body, such as the tail 202*d* of an elephant.

In this example, feeding device support structure 203 may comprise additional elements to contribute to a resemblance of an animal head, such as the eyes, ears, and/or nose (trunk) of an elephant.

Patterns, prints, and/or designs may be selected that are consistent with an animal theme for a particular apparatus. For example, a grey print fabric/textile resembling the color of an elephant may be selected for use in/on the body 202*a* and feed device support structure 203.

Figure 3A:
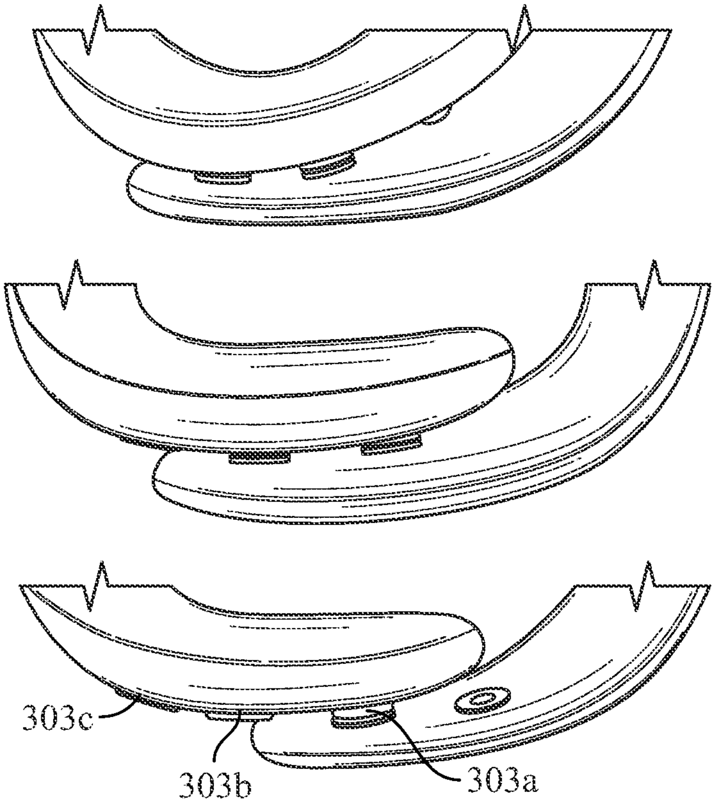
FIG. 3A shows various adjustable attachment positions of a third exemplary embodiment of a neck-supporting feeding apparatus.

FIG. 3A shows various adjustable attachment positions of a third exemplary embodiment of a neck-supporting feeding apparatus 301.

In some embodiments, feeding apparatus 301 allows for various adjustment levels 303*a*-303*c* to calibrate the distance of a feeding device from an infant's mouth and/or face.

Adjustment levels 303*a*-303*c* may be selected by adjusting and/or using settings of an attachment mechanism, such as multiple snap buttons set at various and/or incremental distances from the ends of an open O-ring body 302. For example, three snap buttons may be set at one-inch increments from the ends of an open O-ring body 302.

An example calculation is provided showing a decrease in the distance that is accomplished by changing an adjustment level.

At a first adjustment level, an O-ring body may form a circumference of 31.4 inches and comprise the following associated characteristics:

Circumference=2Πr=31.4

Diameter=d~10 inches

Radius=r~5 inches

For example, at a second adjustment, wherein a second snap button is positioned 1 inch further from the first snap button and the end of the cushion's end, the circumference is reduced to roughly 9.68 inches. Thus, the distance of a feeding device seated in the apparatus from an infant's face is reduced by roughly 9.68 inches.

Figure 3B:
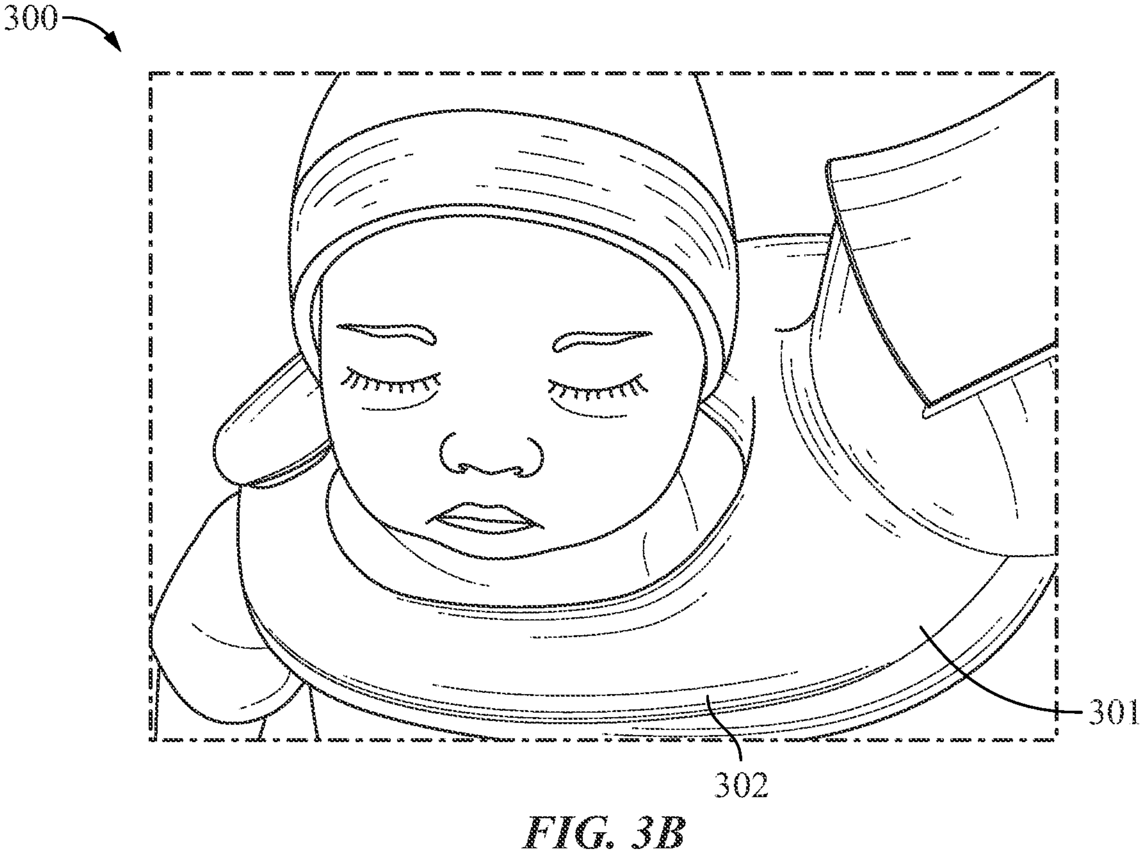
FIG. 3B is a third perspective view of the third exemplary embodiment of the neck-supporting feeding apparatus while in use.

FIG. 3B is a third perspective view 300 of the third exemplary embodiment of neck supporting feeding apparatus 301 while in use.

Figure 4:
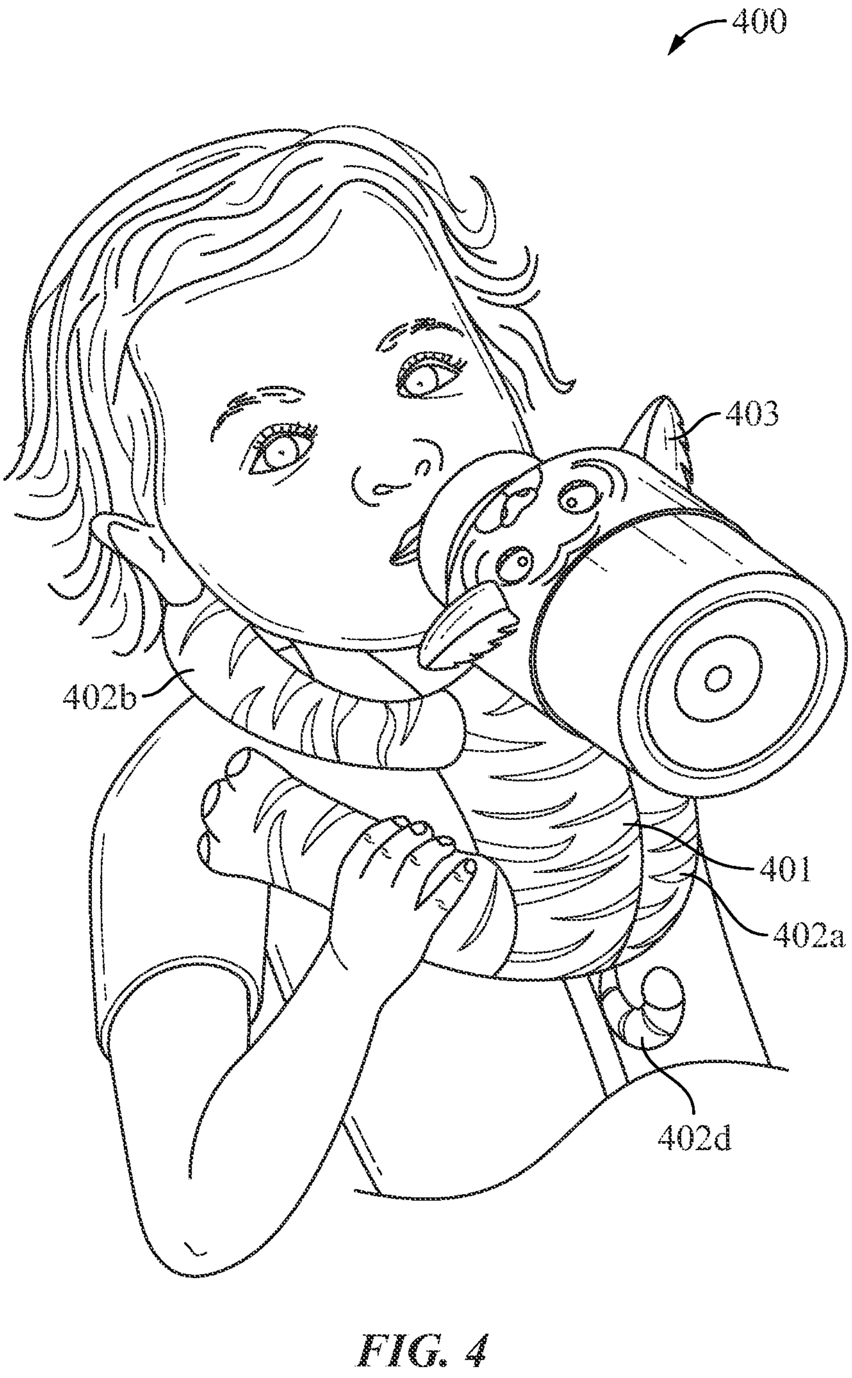
FIG. 4 is a fourth perspective view of a fourth exemplary embodiment of neck supporting feeding apparatus while in use.

FIG. 4 is a fourth perspective view 400 of a fourth exemplary embodiment of a neck-supporting feeding apparatus 401 while in use.

In this example, feeding apparatus 401 may be comprised of body 402*a* and a feeding device support structure 403. Feeding device support structure 403 may also be referred to as a seating, seating structure, and/or base.

Body 402*a* and/or feeding device support structure 403 may each comprise or form one or more cushions.

It will be understood that the body 402*a* can take various forms and feeding device support structure 403 can take various forms.

In this example, a feeding apparatus is shown wherein the apparatus comprises several animal features to create a resemblance of an animal and/or animal doll. The resemblance of an animal and/or doll may facilitate an infant's amicability, entertainment, and/or engagement with apparatus 401, for example. In some examples, the ability of apparatus 401 to entertain an infant while also assisting/enabling the infant in using a feeding device permits a caregiver to focus on other activities.

Body 402*a* and/or feeding device support structure 403 may comprise parts resembling parts of an animal. For example, body 402*a* and/or feeding device support structure 403 may comprise parts resembling a body of a tiger and a head of a tiger, respectively.

Overlapping and underlapping ends of an open ring shape body 402*a* of feeding apparatus 401 comprises a design, shape, and/or pattern to resemble the "arms" (i.e., front legs) of a tiger.

As described herein, a first end 402*b* and a second end 402*c* of open ring body 402*a* may be allowed to adjustably connect to encircle the neck of an infant, for example. The connection between the first end 402*b* and the second end 402*c* may create an impression that the infant is being "hugged" by a tiger doll.

The adjustability of the connection of the first end 402*b* and the second end 402*c* allows for adjustment of the circumference and diameter of the ring formed when the first end 402*b* and the second end 402*c* are connected. Adjustment of the circumference and diameter of the ring formed when the first end 402*b* and the second end 402*c* are connected may have an effect of changing the distance of a feeding device seated and/or positioned in feeding device support structure 403 and the infant's face/mouth.

In this example, body 402*a* may comprise additional elements to contribute to a resemblance of an animal body, such as the tail 402*d* of a tiger.

In this example, feeding device support structure 403 may comprise additional elements to contribute to a resemblance of an animal head, such as the eyes, ears, and/or nose of a tiger.

Patterns, prints, and/or designs may be selected that are consistent with an animal theme for a particular apparatus. For example, an orange and white striped print fabric/textile resembling the color/pattern of a tiger's coat may be selected for use in/on the body 402*a* and feed device support structure 403.

Figure 5:
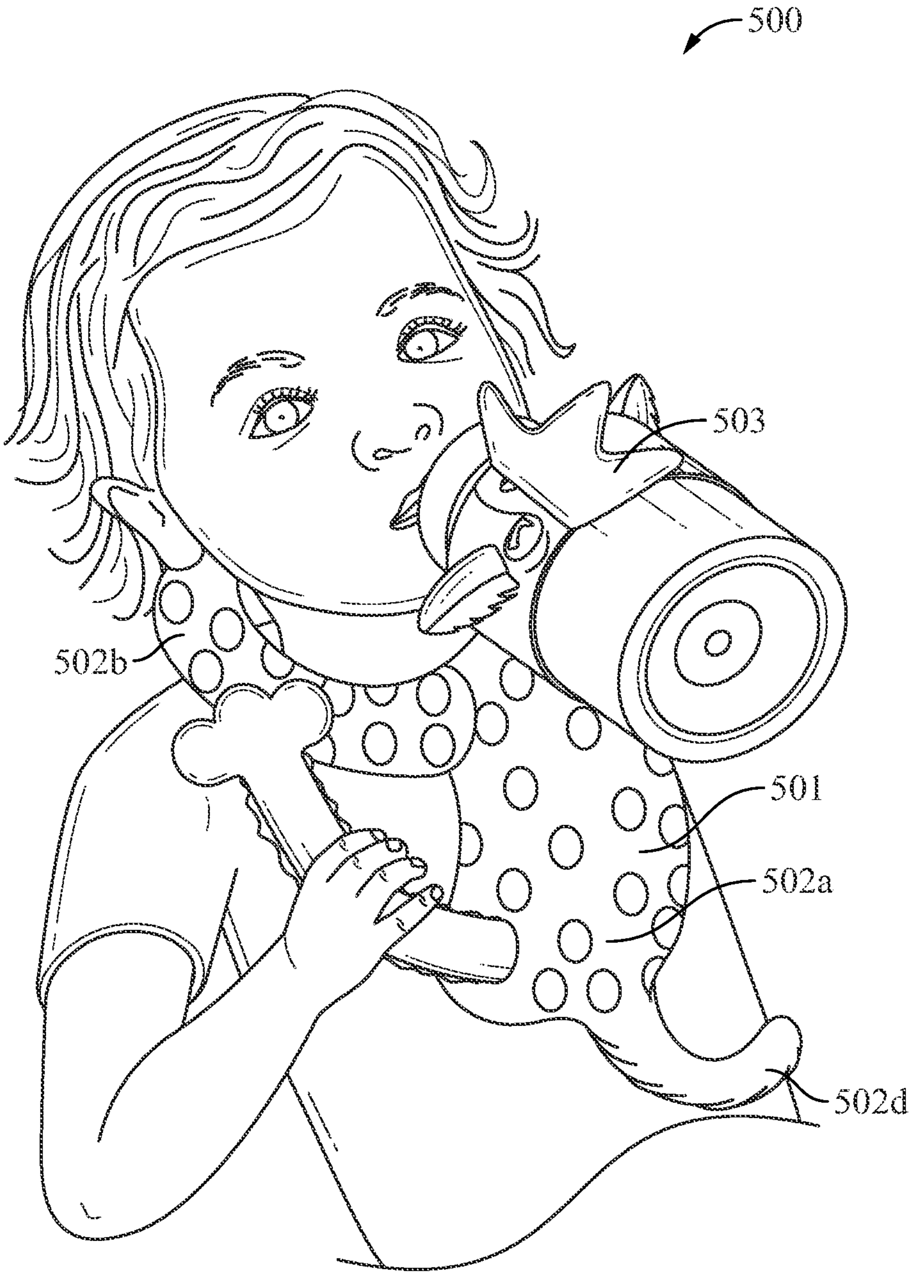
FIG. 5 is a fifth perspective view of a fifth exemplary embodiment of neck-supporting feeding apparatus while in use.

FIG. 5 is a fifth perspective view 500 of a fifth exemplary embodiment of neck supporting feeding apparatus 501 while in use.

In this example, feeding apparatus 501 may be comprised of body 502*a* and a feeding device support structure 503. Feeding device support structure 503 may also be referred to as a seating, seating structure, and/or base.

Body 502*a* and/or feeding device support structure 503 may each comprise or form one or more cushions.

It will be understood that the body 502*a* can take various forms and feeding device support structure 503 can take various forms.

In this example, a feeding apparatus is shown wherein the apparatus comprises several animal features to create a resemblance of an animal and/or animal doll. The resemblance of an animal and/or doll may facilitate an infant's amicability, entertainment, and/or engagement with apparatus 501, for example. In some examples, the ability of apparatus 501 to entertain an infant while also assisting/enabling the infant in using a feeding device permits a caregiver to focus on other activities.

Body 502*a* and/or feeding device support structure 503 may comprise parts resembling parts of an animal. For example, body 502*a* and/or feeding device support structure 503 may comprise parts resembling a body of a dinosaur and a head of a dinosaur, respectively.

Overlapping and underlapping ends of an open ring shape body 502*a* of feeding apparatus 501 comprises a design, shape, and/or pattern to resemble the "arms" (i.e., front legs) of a dinosaur.

As described herein, a first end 502*b* and a second end 502*c* of open ring body 502*a* may be allowed to adjustably connect to encircle the neck of an infant, for example. The connection between the first end 502*b* and the second end 502*c* may create an impression that the infant is being "hugged" by a dinosaur doll.

The adjustability of the connection of the first end 502*b* and the second end 502*c* allows for adjustment of the circumference and diameter of the ring formed when the first end 502*b* and the second end 502*c* are connected. Adjustment of the circumference and diameter of the ring formed when the first end 502*b* and the second end 502*c* are connected may have an effect of changing the distance of a feeding device seated and/or positioned in feeding device support structure 503 and the infant's face/mouth.

In this example, body 502*a* may comprise additional elements to contribute to a resemblance of an animal body, such as the tail 502*d* of a dinosaur.

In this example, feeding device support structure 503 may comprise additional elements to contribute to a resemblance of an animal head, such as the eyes, ears, and/or nose of a dinosaur.

Patterns, prints, and/or designs may be selected that are consistent with an animal theme for a particular apparatus. For example, spotted print fabric/textile resembling the color/pattern of a dinosaur's skin may be selected for use in/on the body 502*a* and feed device support structure 503.

Figure 6:
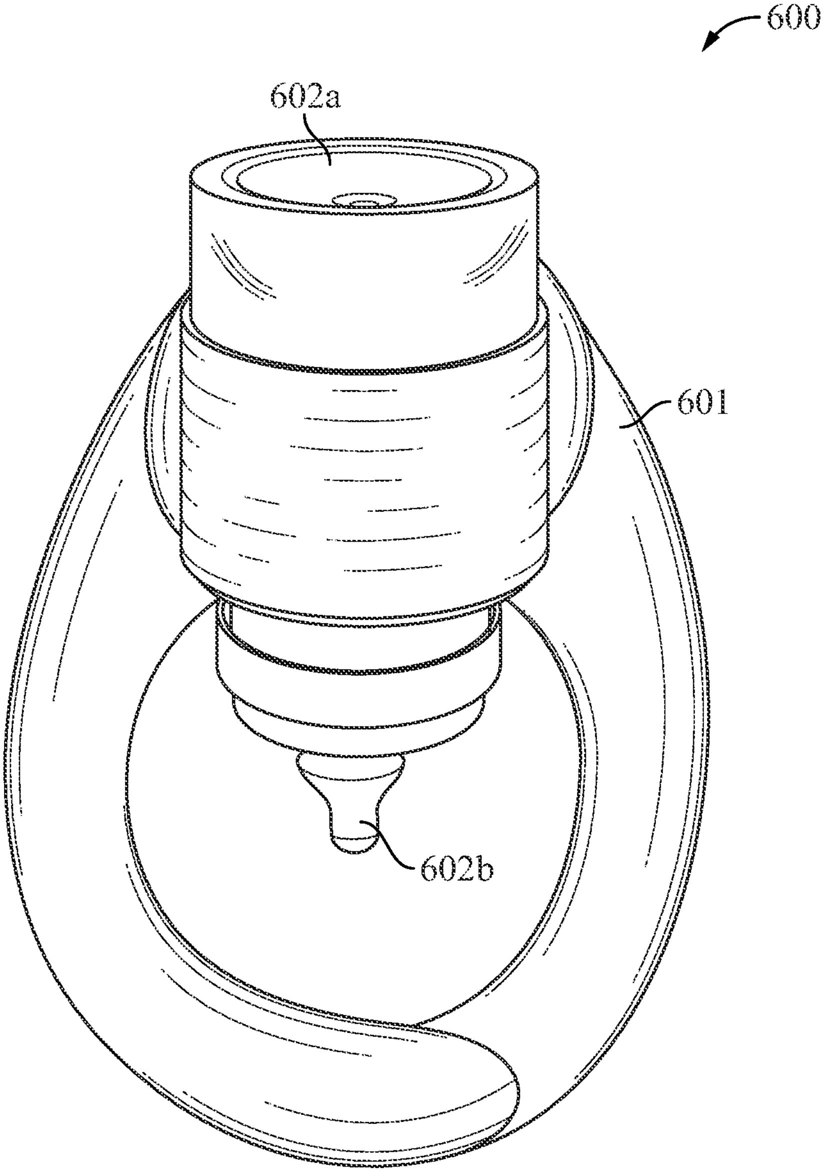
FIG. 6 is a sixth perspective view of a sixth exemplary embodiment of a neck-supporting feeding apparatus with a baby bottle positioned.

FIG. 6 is a sixth perspective view 600 of a sixth exemplary embodiment of a neck-supporting feeding apparatus 601 with a baby bottle 602*a* positioned.

Sixth perspective view 600 of a sixth exemplary embodiment is an overhead view of a neck-supporting feeding apparatus 601.

Feeding apparatus 601 comprises an open ring-shaped apparatus that can be adjustably closed to form a complete ring for encircling an infant's neck, for example. Adjustability allows for changing the distance between the nipple 602*b* of the baby bottle 602*a* and an infant's face/mouth by increasing/decreasing the size of the ring formed by enclosing the ends of apparatus 601.

Figure 7:
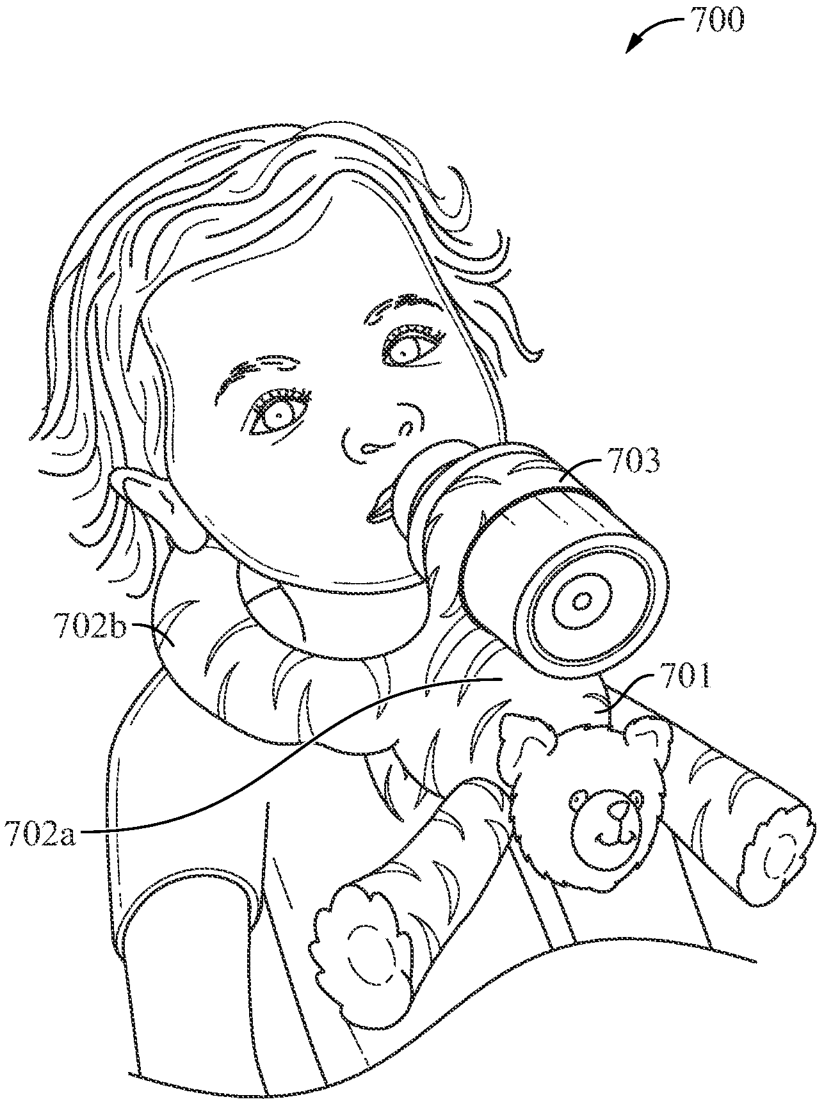
FIG. 7 is a seventh perspective view of a seventh exemplary embodiment of neck-supporting feeding apparatus while in use.

FIG. 7 is a seventh perspective view 700 of a seventh exemplary embodiment of neck supporting feeding apparatus 701 while in use.

In this example, feeding apparatus 701 may be comprised of body 702*a* and a feeding device support structure 703. Feeding device support structure 703 may also be referred to as a seating, seating structure, and/or base.

Body 702*a* and/or feeding device support structure 703 may each comprise or form one or more cushions.

It will be understood that the body 702*a* can take various forms and feeding device support structure 703 can take various forms.

In this example, a feeding apparatus is shown wherein the apparatus comprises several animal features to create a resemblance of an animal and/or animal doll. The resemblance of an animal and/or doll may facilitate an infant's amicability, entertainment, and/or engagement with the apparatus 701, for example. In some examples, the ability of apparatus 701 to entertain an infant while also assisting/enabling the infant in using a feeding device permits a caregiver to focus on other activities.

Body 702*a* and/or feeding device support structure 703 may comprise parts resembling parts of an animal. For example, body 702*a* and/or feeding device support structure 703 may comprise parts resembling a body of a bear and a head of a bear.

Overlapping and underlapping ends of an open ring shape body 702*a* of feeding apparatus 701 comprises a design, shape, and/or pattern to resemble the legs (i.e., back legs) of a bear.

As described herein, a first end 702*b* and a second end 702*c* of open ring body 702*a* may be allowed to adjustably connect to encircle the neck of an infant, for example. The connection of the first end 702*b* and the second end 702*c* may create an impression that the infant is being "hugged" by a bear doll.

The adjustability of connection of the first end 702*b* and the second end 702*c* allows for adjustment of the circumference and diameter of the ring formed when the first end 702*b* and the second end 702*c* are connected. Adjustment of the circumference and diameter of the ring formed when the first end 702*b* and the second end 702*c* are connected may have an effect of changing the distance of a feeding device seated and/or positioned in feeding device support structure 703 and the infant's face/mouth.

In this example, body 702*a* may comprise additional elements to contribute to a resemblance of an animal body.

Patterns, prints, and/or designs may be selected that are consistent with an animal theme for a particular apparatus. For example, spotted print fabric/textile resembling the color/pattern of a bear's coat may be selected for use in/on the body 702*a* and feed device support structure 703.

Figure 8:
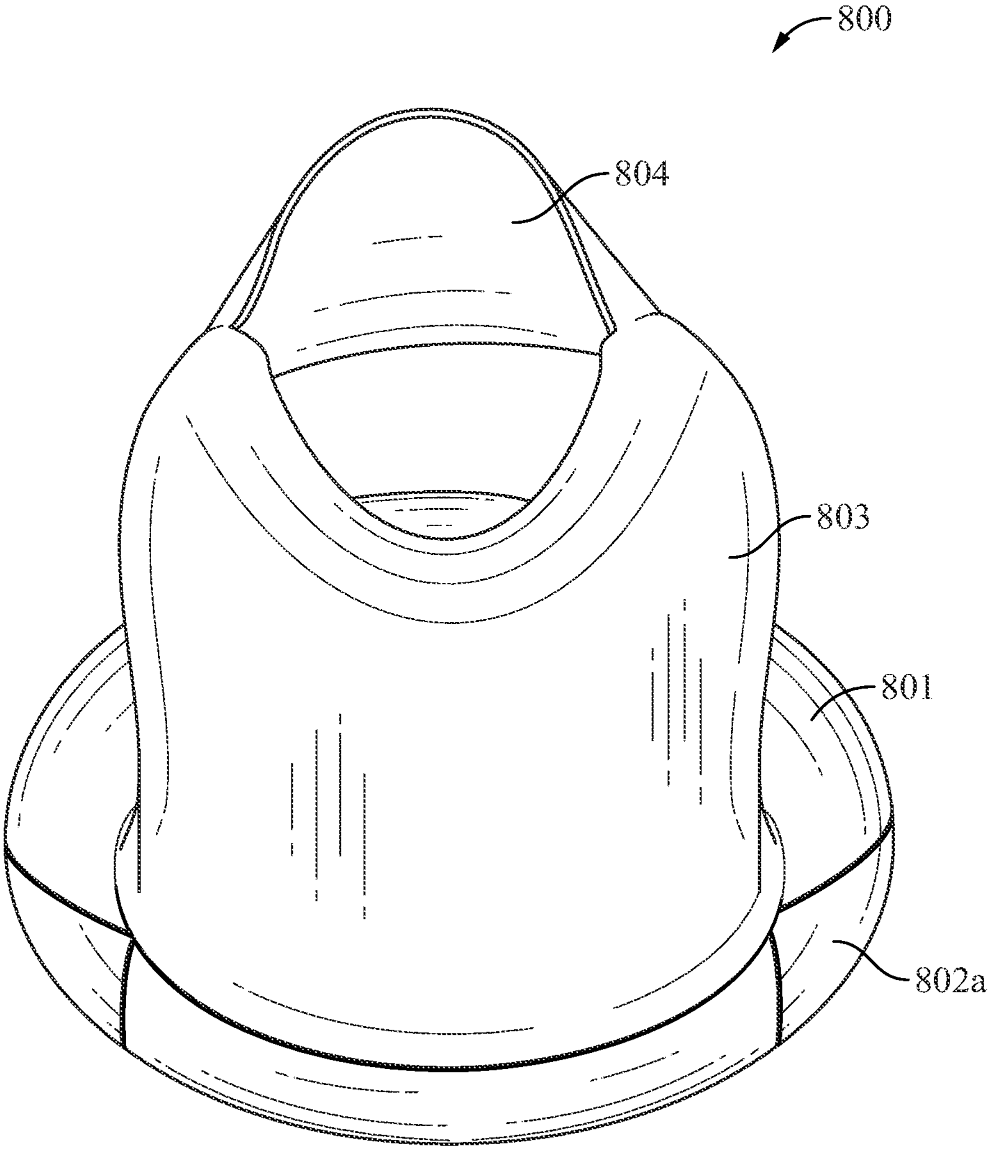
FIG. 8 is an eighth perspective view of an eighth exemplary embodiment of a neck-supporting feeding apparatus.

FIG. 8 is an eighth perspective view 800 of an eighth exemplary embodiment of neck supporting feeding apparatus 801.

Eighth perspective view 800 of as eighth exemplary embodiment is an underside view of a neck-supporting feeding apparatus 801.

In this example, feeding apparatus 801 may be comprised of body 802*a* and a feeding device support structure 803. Feeding device support structure 803 may also be referred to as a seating, seating structure, and/or base.

Body 802*a* and/or feeding device support structure 803 may each comprise or form one or more cushions. Feeding device support structure 803 may further comprise an elastic band 804 for positioning and/or fastening a feeding device.

Figure 9:
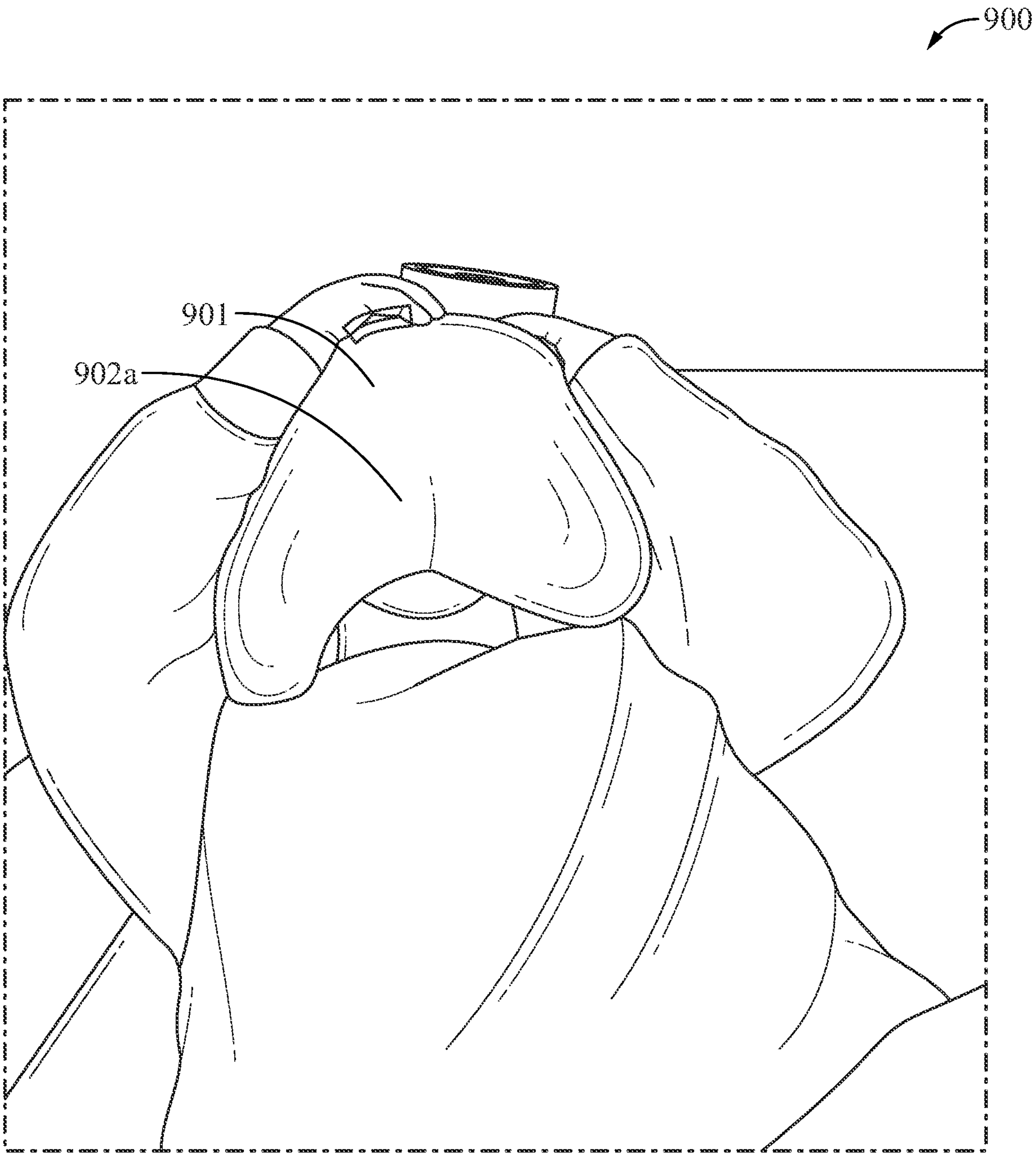
FIG. 9 is a ninth perspective view of a ninth exemplary embodiment of neck-supporting feeding apparatus while in use.

FIG. 9 is a ninth perspective view 900 of a ninth exemplary embodiment of neck supporting feeding apparatus 901 while in use.

Body 902*a* and/or feeding device support structure 903 may each comprise or form one or more cushions. Feeding device support structure 903 may further comprise an elastic band 904 for positioning and/or fastening a feeding device.

As it can be seen in this example, an infant may be able to bring feeding device support structure 903 closer to his face, and with it, a feeding device, without the need for fine motor control for handling, supporting, and/or fully maintaining a position of the feeding device.

Figure 10:
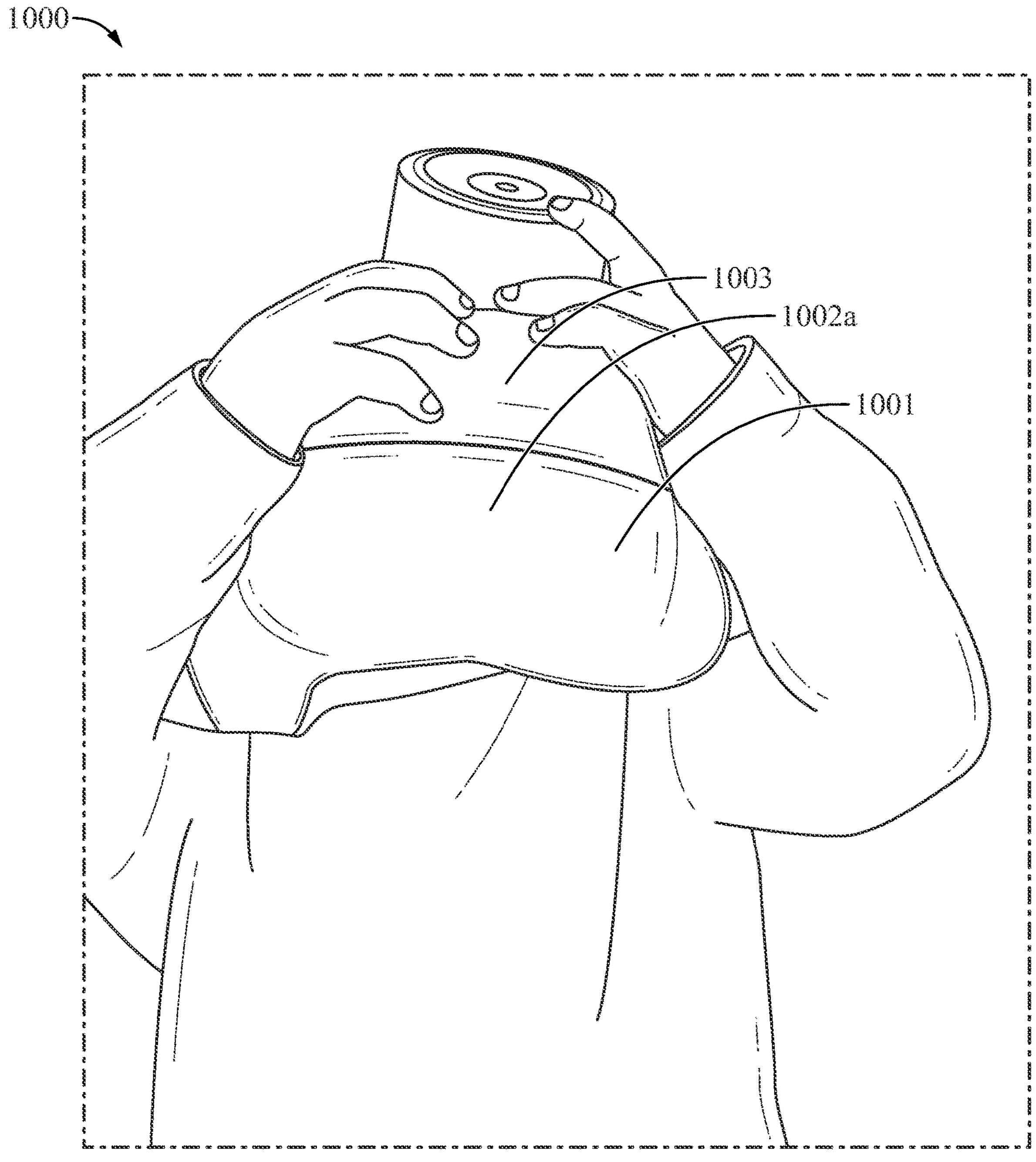
FIG. 10 is a tenth perspective view of a tenth exemplary embodiment of neck supporting feeding apparatus while in use.

FIG. 10 is a tenth perspective view 1000 of a tenth exemplary embodiment of neck supporting feeding apparatus 1001 while in use.

Body 1002*a* and/or feeding device support structure 1003 may each comprise or form one or more cushions. Feeding device support structure 1003 may further comprise an elastic band 1004 for positioning and/or fastening a feeding device.

As it can be seen in this example, an infant may be able to bring feeding device support structure 1003 closer to his face, and with it, a feeding device, without the need for fine motor control for handling, supporting, and/or fully maintaining a position of the feeding device.

Figure 11:
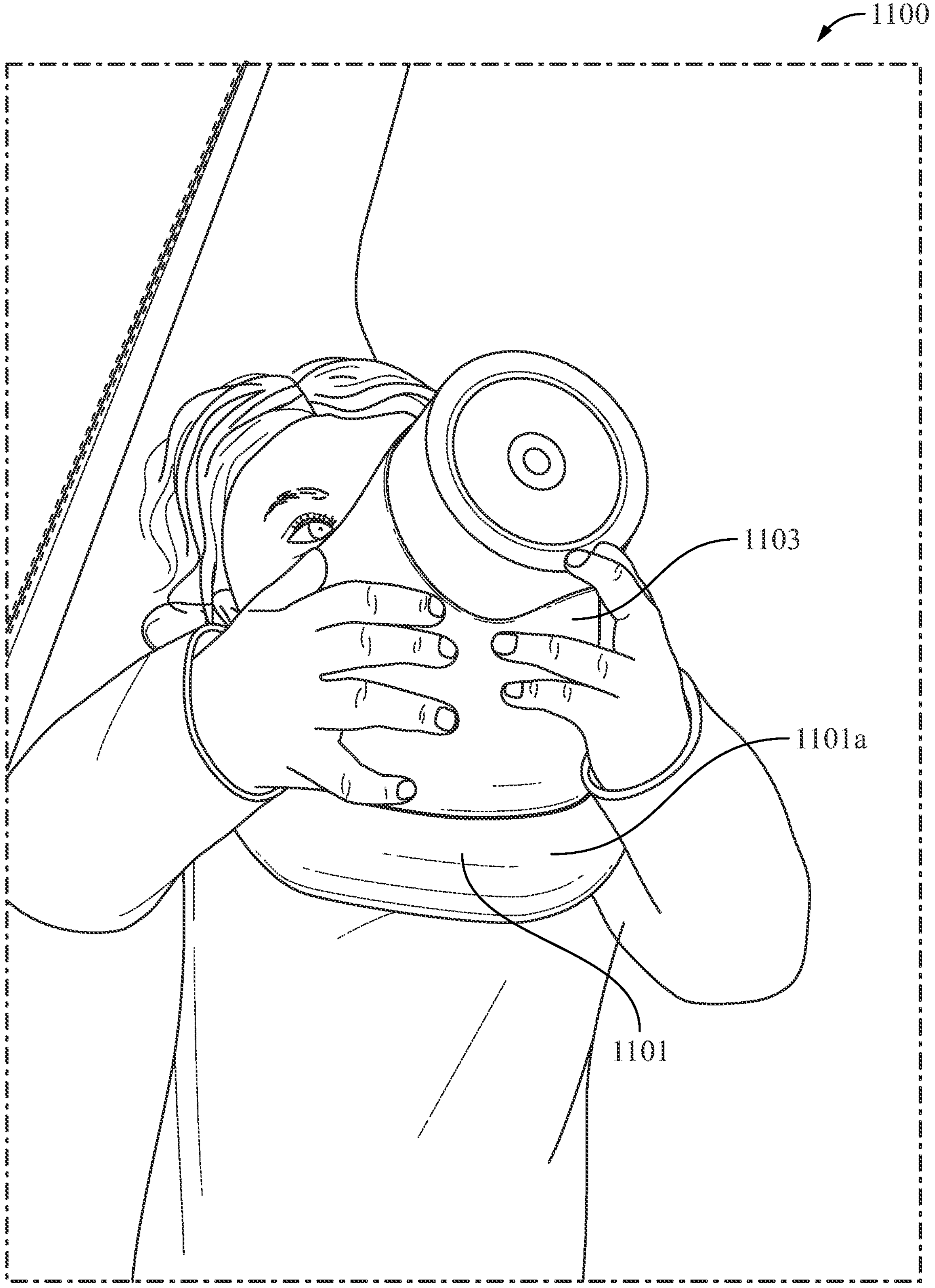
FIG. 11 is an eleventh perspective view of an eleventh exemplary embodiment of neck supporting feeding apparatus while in use.

FIG. 11 is an eleventh perspective view 1100 of an eleventh exemplary embodiment of neck supporting feeding apparatus 1101 while in use.

Body 1102*a* and/or feeding device support structure 1103 may each comprise or form one or more cushions. Feeding device support structure 1103 may further comprise an elastic band 1104 for positioning and/or fastening a feeding device.

As it can be seen in this example, an infant may be able to bring feeding device support structure 1103 closer to his face, and with it, a feeding device, without the need for fine motor control for handling, supporting, and/or fully maintaining a position of the feeding device.

Figure 12:
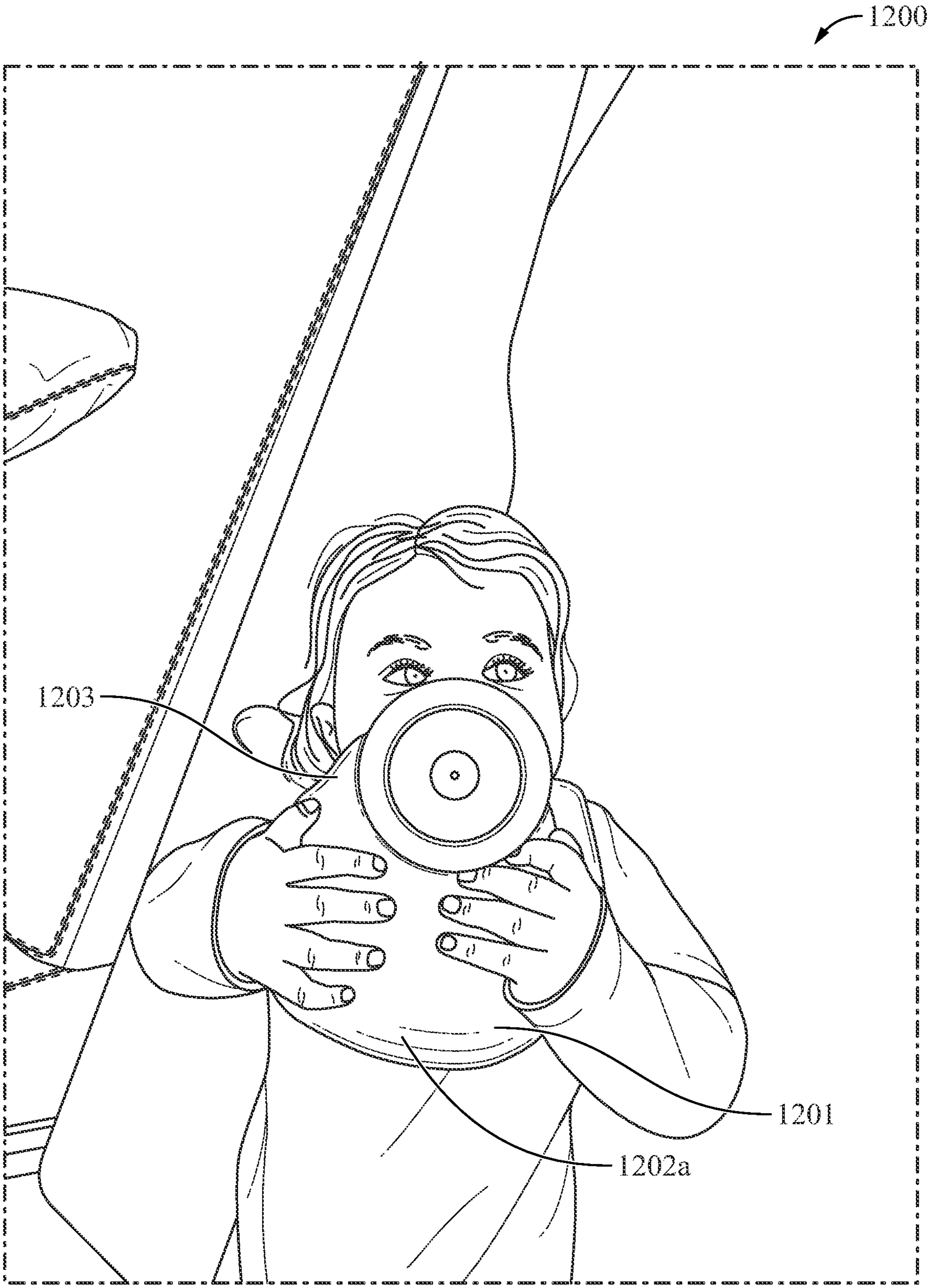
FIG. 12 is a twelfth perspective view of a twelfth exemplary embodiment of neck supporting feeding apparatus while in use.

FIG. 12 is a twelfth perspective view 1200 of a twelfth exemplary embodiment of neck supporting feeding apparatus 1201 while in use.

Body 1202*a* and/or feeding device support structure 1203 may each comprise or form one or more cushions. Feeding device support structure 1203 may further comprise an elastic band 1204 for positioning and/or fastening a feeding device.

As it can be seen in this example, an infant may be able to bring feeding device support structure 1203 closer to his face, and with it, a feeding device, without the need for fine motor control for handling, supporting, and/or fully maintaining a position of the feeding device.

Advantages

As shown, embodiments herein assist and/or allow for enabling infants to hold their own feeding devices such as bottles and/or sip cups. By doing so, embodiments herein assist infants to feed themselves.

Thus, embodiments herein provide numerous advantages over existing technologies.

In one example, enabling infants and/or youngsters to require much less help and/or attention from their caregivers (i.e., usually multiple times throughout the feeding process), caregivers become free to perform other tasks.

In another example, embodiments herein allow a mother can feed a baby while she relaxes her arms.

In another example, embodiments herein provide fun and entertainment for a baby while a caregiver performs tasks such as eating meals, etc.

In another example, embodiments herein can be used in baby strollers while caretakers push the carriage.

In another example, embodiments herein allow for twins and or triplets so they feed at the same time.

What is claimed is:

1. An apparatus consisting of:

a body comprising an open ring shape, the open ring shape comprising a first end and a second end; and a feeding device support structure, wherein the body comprises a first set of one or more pieces of fabric;

wherein the feeding device support structure comprises a second set of one or more pieces of fabric;

wherein the body and feeding device support structure are attached by one or more seams;

wherein the feeding device support structure consists of a U-shaped support structure and an elastic band attached to an animal shape and configured for positioning a feeding device; and wherein the U-shaped support structure is integrated into the animal shape.

2. The apparatus of claim 1, wherein the body comprises one or more adjustable levels allowing attachment of the first end and the second end to form a closed ring.

3. The apparatus of claim 2, wherein the one or more adjustable levels comprise at least three adjustable levels.

4. The apparatus of claim 2, wherein each of the one or more adjustable levels is associated with a different resultant diameter of the closed ring.

5. The apparatus of claim 4, wherein each of the one or more adjustable levels proportionally changes a resultant diameter of the closed ring.

6. The apparatus of claim 4, wherein the apparatus resembles an animal doll.

7. The apparatus of claim 6, wherein the body resembles the front legs of the animal doll.

8. An apparatus consisting of:

a body comprising a first cushion for supporting an infant's head; and a feeding device support structure comprising a second cushion for seating a feeding device;

wherein the body and feeding device support structure are attached by one or more seams;

wherein the feeding device support structure consists of:

a U-shaped support structure having an attached elastic band, wherein the U-shaped support structure having the attached elastic band are integrated into a pillow of an animal shape.

9. The apparatus of claim 8, wherein the body comprises one or more adjustable levels allowing attachment of a first end and a second end to form a closed ring.

10. The apparatus of claim 9, wherein the one or more adjustable levels comprise at least three adjustable levels.

11. The apparatus of claim 9, wherein each of the one or more adjustable levels is associated with a different resultant diameter of the closed ring.

12. The apparatus of claim 11, wherein each of the one or more adjustable levels proportionally changes a resultant diameter of the closed ring.

13. The apparatus of claim 11, wherein the apparatus resembles an animal doll.

14. The apparatus of claim 13, wherein the body resembles the front legs of the animal doll.

15. An apparatus consisting of:

a body; and a feeding device support structure, wherein the body and feeding device support structure comprises one or more pieces of fabric forming a U-shaped support structure covered by an elastic band configured for holding a bottle, and wherein:

the one or more pieces of fabric are attached by one or more seams;

the body comprises an open ring shape; and the apparatus comprises an animal design and/or shape.

16. The apparatus of claim 15, wherein the body comprises one or more adjustable levels allowing attachment of the first end and the second end to form a closed ring.

17. The apparatus of claim 16, wherein the one or more adjustable levels comprise at least three adjustable levels.

18. The apparatus of claim 16, wherein each of the one or more adjustable levels is associated with a different resultant diameter of the closed ring.

19. The apparatus of claim 18, wherein each of the one or more adjustable levels proportionally changes a resultant diameter of the closed ring.

20. The apparatus of claim 18, wherein the apparatus resembles an animal doll; and wherein the body resembles the front legs of the animal doll.

* * * * *